US010184843B2

(12) United States Patent
Hashemian et al.

(10) Patent No.: US 10,184,843 B2
(45) Date of Patent: Jan. 22, 2019

(54) THERMAL PROTECTION SYSTEMS MATERIAL DEGRADATION MONITORING SYSTEM

(71) Applicant: ANALYSIS AND MEASUREMENT SERVICES CORPORATION, Knoxville, TN (US)

(72) Inventors: Alexander Hashemian, Knoxville, TN (US); Trevor Toll, Knoxville, TN (US)

(73) Assignee: Analysis and Measurement Services Corporation, Knoxville, TN (US)

( * ) Notice: Subject to any disclaimer, the term of this patent is extended or adjusted under 35 U.S.C. 154(b) by 256 days.

(21) Appl. No.: 15/142,496

(22) Filed: Apr. 29, 2016

(65) Prior Publication Data

US 2016/0320248 A1   Nov. 3, 2016

Related U.S. Application Data

(60) Provisional application No. 62/155,208, filed on Apr. 30, 2015.

(51) Int. Cl.
*G01K 7/00*    (2006.01)
*G01K 1/00*    (2006.01)
*G01K 7/02*    (2006.01)
*G01K 15/00*   (2006.01)

(52) U.S. Cl.
CPC ............. *G01K 7/02* (2013.01); *G01K 15/007* (2013.01)

(58) Field of Classification Search
USPC ..................................... 374/1, 179, 208, 166
See application file for complete search history.

(56) References Cited

U.S. PATENT DOCUMENTS

| 6,102,565 A * | 8/2000 | Kita | ................. G01K 7/02 136/233 |
| 2012/0120986 A1* | 5/2012 | Konno | ................. G01K 7/04 374/179 |

OTHER PUBLICATIONS

Hashemian, H.M.; Response time testing of temperature sensors using loop current step response method; Int. J. Nuclear Energy Science and Technology, vol. 7, No. 3, pp. 209-230.

* cited by examiner

*Primary Examiner* — Mirellys Jagan
(74) *Attorney, Agent, or Firm* — Pitts & Lake, P.C.

(57) ABSTRACT

A method of identifying changes in a host material having a thermocouple embedded therein which includes using a Loop Current Step Response (LCSR) test method on a first thermocouple to obtain thermocouple LCSR data for the first thermocouple, recording the obtained thermocouple LCSR data within a storage medium, placing a second thermocouple identical to the first thermocouple at different location within a host material, monitoring sensor response data for second the thermocouple, comparing the sensor response data for the second thermocouple with the thermocouple LCSR data of the first thermocouple stored within the storage medium and identifying changes in the host material based on differences in sensor response data for the second thermocouple based on the stored thermocouple LCSR data of the first thermocouple.

4 Claims, 2 Drawing Sheets

THERMAL PROTECTION SYSTEMS MATERIAL DEGRADATION MONITORING SYSTEM

CROSS-REFERENCE TO RELATED APPLICATIONS

This application claims the benefit of U.S. Provisional Application No. 62/155,208 filed on Apr. 30, 2015, the disclosure of which is hereby incorporated by reference herein in its entirety.

FIELD OF INVENTION

The present general inventive concept relates to a thermocouple, and more particularly to a balanced-lead thermocouple having a lead temperature ratio of unity when subjected to resistive joule heating. The balanced-lead thermocouple according to the present invention is designed such that the thermocouple bead and leads are at the same initial temperature, when using a Loop Current Step Response (LCSR) test method. The balanced-lead thermocouple, characterized by the LCSR test method, may be configured to measure both temperature and fluid velocity.

The present general inventive concept also relates to a system and method of monitoring material degradation, and more particularly to a system and method of determining material degradation of a host material based on the thermal response of a balanced-lead thermocouple embedded within the host material.

The present general inventive concept also relates to a system and method of monitoring the thermal response of a sensor embedded within a host material, and more particularly to an in-situ instrumentation system used in conjunction with a Loop Current Step Response (LCSR) test method used to identify the sensor's response over time as a function of changes to the interface between the sensor and the host material.

The method according to the present general inventive concept provides a technique to monitor host material to sensor interface conditions and provides qualitative insight into host material degradation mechanisms.

BACKGROUND

For many high-temperature and transient applications, thermocouples are suitable temperature sensors due to their simple design, fast response times, and ability to accommodate unique installation geometries. However, conventional thermocouples cannot be adequately characterized in-situ to determine the thermocouple's time constant.

The time constant is a valuable parameter in correcting for lag associated with the thermal response of a sensor when subjected to highly transient processes or environments. A sensor's time constant provides a quantitative metric of how fast or slow the sensor responds to a change in ambient conditions. However, conventional thermocouples cannot be adequately tested in-situ and analyzed to obtain the thermocouple's time constant.

The conventional method for determining temperature sensor time constant is referred to as the plunge test. Typically, the time constants of resistance temperature detectors (RTD) (i.e., temperature sensors) have been characterized by a single variable called the plunge time constant, which refers to an amount of time required for the sensor output to achieve 63.2% of its final value after a step change in temperature is imposed on the sensor's surface. A step change in temperature is imposed in a testing environment by suddenly drawing the sensor from one medium at an initial temperature to another medium, usually water flowing at 1 ms-1, at a different temperature. However, the plunge test method is deficient in that this method does not account for an influence of process conditions and/or installation of the sensor on the time constant of the sensor.

In order to address the problems with the plunge test, the Loop Current Step Response (LCSR) test method was developed. The LCSR in-situ test method is based on heating a temperature sensor internally by applying a step change in current applied to leads of the sensor. The current heats the sensing element of the sensor and the sensor's temperature rises as a function of the magnitude of the supplied current and the rate of heat transfer between the sensor and its surroundings (e.g., host material). The resulting temperature transient is then analyzed to provide a time constant. As a result, the LCSR test method provides in-situ time constants of the sensors, which are more accurate and precise than time constants determined by the plunge test before sensor installation.

Therefore, what is desired is a thermocouple designed to be analyzed in-situ and a system and method incorporating such thermocouple which monitors degradation of a material in contact with the thermocouple based on sensor interface conditions.

BRIEF SUMMARY

The present general inventive concept provides a balanced-lead thermocouple having a lead temperature ratio of unity when subjected to resistive joule heating. The balanced-lead thermocouple according to the present invention is designed such that the thermocouple bead (i.e., sensing element) and leads are at the same initial temperature, when using a Loop Current Step Response (LCSR) test method. The balanced-lead thermocouple, characterized by the LCSR test method, may be configured to measure both temperature and fluid velocity.

The present general inventive concept also provides a method of in-situ thermal response testing of a balanced-lead thermocouple (BTC).

The present general inventive concept also relates to a system and method of characterizing and monitoring material degradation of a host material based on the thermal response of a BTC embedded within the host material.

The present general inventive concept also relates to an in-situ BTC instrumentation system used in conjunction with a Loop Current Step Response (LCSR) test method used to identify a sensor's time constant as a function of changes to the interface between the sensor and the host material.

According to the present invention, the method of in-situ thermal response testing provides a technique to monitor host material to sensor interface conditions. As such, the method provides qualitative insight into host material degradation mechanisms.

BRIEF DESCRIPTION OF THE SEVERAL VIEWS OF THE DRAWINGS

The above-mentioned features of the present general inventive concept will become more clearly understood from the following detailed description of the invention read together with the drawings in which.

DETAILED DESCRIPTION

The method and system according to the present general inventive concept is capable of evaluating failure mechanisms of a host material based on trending BTC thermal response data over time as the host material degrades when it is subjected to hostile environments that preclude other conventional sensing techniques.

Based on a given thermocouple type, the thermocouple lead wire diameters are selected to accommodate for joule heating to thereby create a balanced thermocouple according to the present invention. That is, one challenge of performing an LCSR test method on a thermocouple is that when the current supplied to the sensor is removed, the leads and the sensing element are not at the same elevated temperature because the leads are composed of two metals with dissimilar electrical resistivities.

Figure 1:
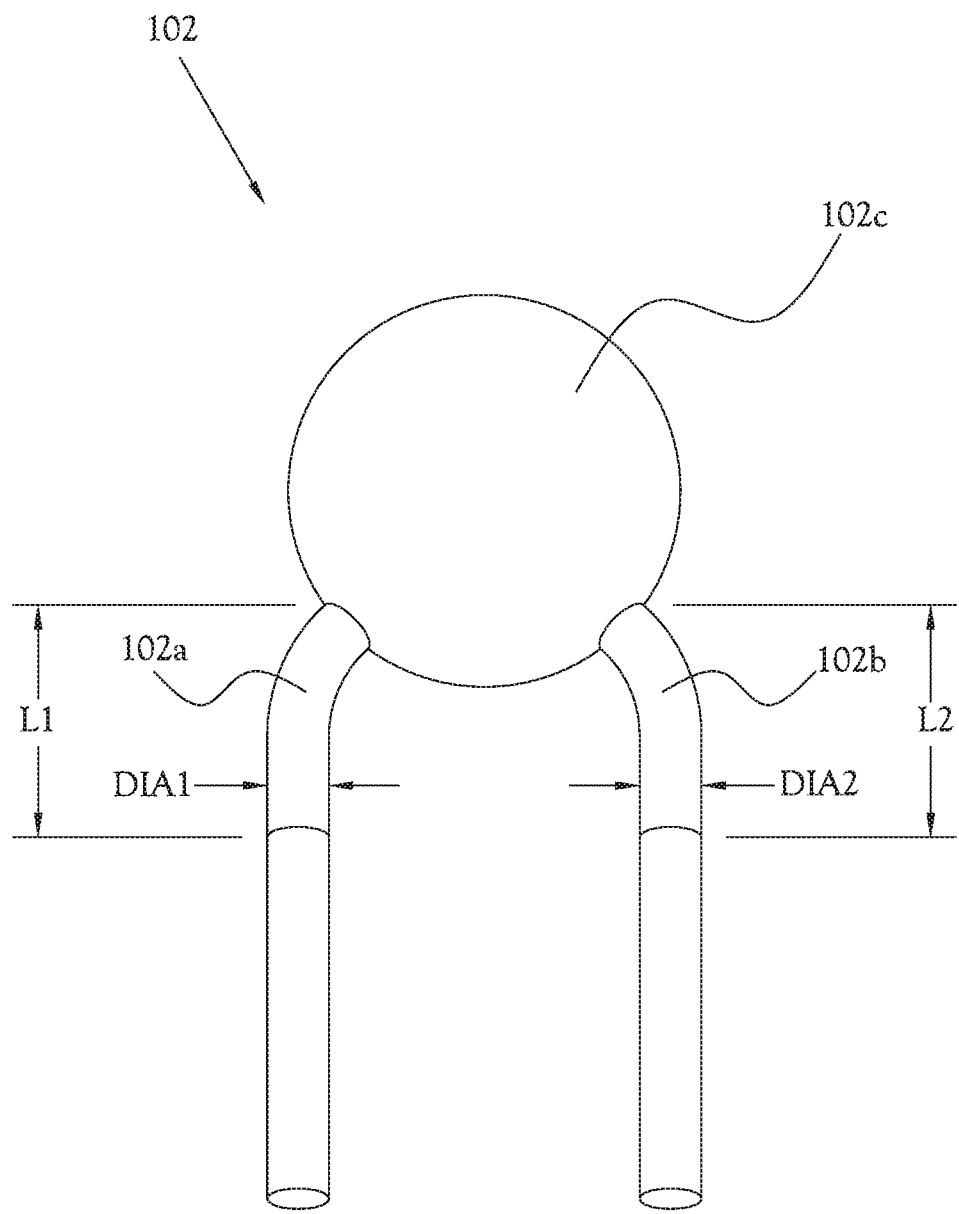
FIG. 1 is a schematic perspective view of a balanced-lead thermocouple according to an exemplary embodiment of the present general inventive concept.

FIG. 1 is a schematic perspective view of a balanced-lead thermocouple 100 according to an exemplary embodiment of the present general inventive concept.

The balanced-lead thermocouple (BTC) 100 of the present invention provides a modified thermocouple construction which accounts for heating discrepancies by adjusting dimensions of the lead wires to balance lead temperatures so that the entire sensor is heated uniformly. The balanced-lead thermocouples (BTC) 102, 104, and 106 are identical to the BTC 102 disclosed below and are provided similar reference numbers.

As illustrated in FIG. 1, the BTC 102 includes a first lead 102a and a second lead 102b coupled to a sensing element 102c. In the present exemplary embodiment, the lengths of the first and second leads 102a, 102b are identical. However, the present general inventive concept is not limited thereto.

In alternative exemplary embodiments, the diameter and material of the leads 102a, 102b may be varied in order to compensate for various inherent shortcomings of the LCSR test method.

The first and second leads 102a and 102b are welded together at a junction to form a spherical bead which is the sensing element 102c of the BTC 102. The sensing element 102c is formed as a composition of material from materials of both the first and second leads 102a and 102b. The first lead 102a has a first diameter DIA1 and the second lead 102b has a second diameter DIA2. In the present embodiment, the first lead 102a is 24AWG Chromel wire and the second lead 102b is 26 AWG Alumel wire. However, the present general inventive concept is not limited thereto. That is, the first diameter DIA1 and the second diameter DIA2 may be precisely machined and/or manufactured such that the entire sensor 102 and the leads are heated uniformly.

The present invention provides a modified thermocouple construction which accounts for heating discrepancies by adjusting all dimensions of the lead wires to balance lead temperatures so that the entire sensor is heated uniformly.

In the present general inventive concept, the BTC 102 uses the same materials as a standard commercially-available thermocouple, and therefore its thermophysical properties of interest have been well documented and tested.

In an exemplary embodiment, an instrumentation system 200 according to the present general inventive concept connects a plurality of the BTCs 100 to specialized hardware (i.e., a data acquisition device) that is capable of providing current for thermal response testing of the plurality of BTCs 102, 104, 106 which are analyzed using accompanying specialized software, while the BTCs are in actual use.

Based on the type of thermocouple selected, the BTC 100 may operate in various temperature ranges including about −200oC to about 2320oC. As such, the BTC 100 combined with the LCSR test method can yield more accurate in-situ positional temperature measurements and response data that may provide qualitative insight into host material degradation. The time constant of the BTC 100 may change based on which type of host material it is embedded in.

That is, the system 200 according to the present invention incorporates the in-situ sensor thermal response testing of the Loop Current Step Response (LCSR) test method on balanced-lead thermocouples (BTCs) 100 embedded within a host material 10 with specialized hardware and software to provide a complete instrumentation system 200.

The system 200 is also capable of obtaining accurate in-situ positional temperature data and sensor response data of BTCs 102, 104, 106 embedded in the host material 10 and determining and evaluating host material failure mechanisms based on an analysis of recorded positional temperature data and sensor response data of the BTCs 102, 104, 106.

In an exemplary embodiment, sensor response data of BTCs 100 is measured and recorded within a testing lab to determine a sensor response profile of each particular BTC 100 type. The BTC 100 is then placed within a host material 10 and the sensor responses are monitored. As the host material 10 degrades while in use, the monitored sensor response profile of the BTCs 100 changes and a user may then predict a type of degradation, a location of degradation, and a time when the host material 10 will completely fail based on the sensor response profiles recorded for each BTC 100 within the testing lab.

Figures 2A, 3A:
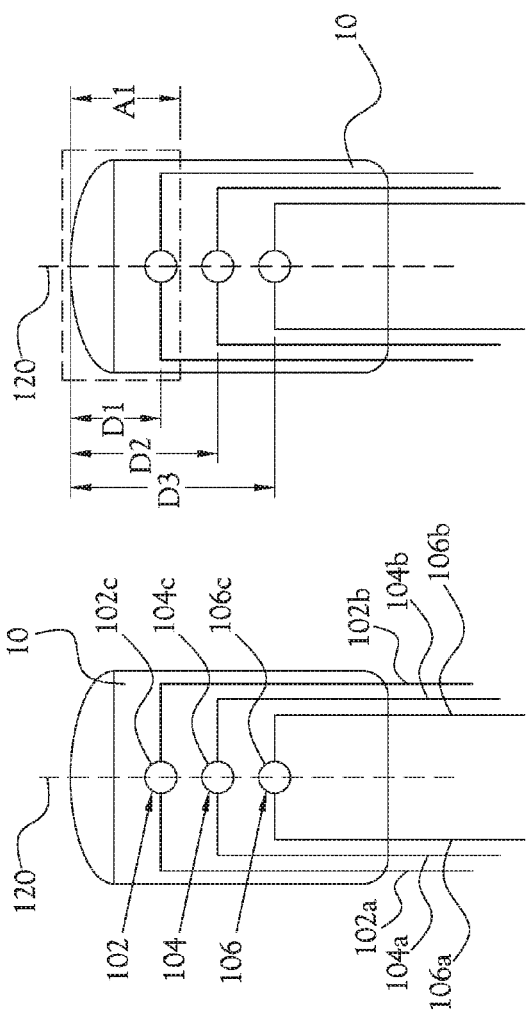
FIG. 2A is a schematic cross-sectional view of a host material having a plurality of balanced-lead thermocouples embedded therein, wherein the host material is at an initial condition without degradation.
FIG. 3A is a schematic cross-sectional view of a host material having a plurality of balanced-lead thermocouples embedded therein, wherein the host material has degraded to a first position.

FIG. 2A is a schematic cross-sectional view of a host material 10 having a plurality of balanced-lead thermocouples 100 embedded therein, wherein the host material 10 is at an initial condition without degradation.

Figures 2B, 3B:
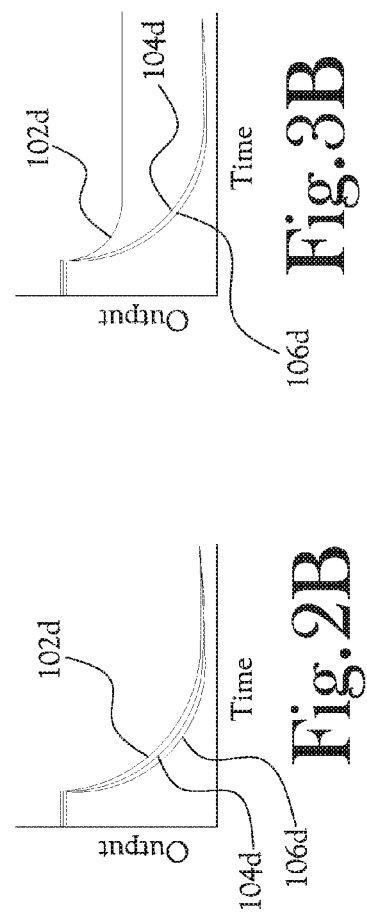
FIG. 2B is a graph illustrating thermocouple response as a function of TPS material degradation therein of the host material illustrated in FIG. 2A.
FIG. 3B is a graph illustrating thermocouple response as a function of TPS material degradation therein of the host material illustrated in FIG. 3A.

Referring to FIG. 2A, a plurality of BTCs 100 including a first BTC 102, a second BTC 104, and a third BTC 106 are placed along a single axis within the host material 10. The first BTC 102 is embedded at a first depth D1, the second BTC 104 is embedded at a second depth D2, and the third BTC 106 is embedded at a third depth D3 within the host material 10. FIG. 2B is a graph illustrating BTCs 102, 104, 106 response as a function of TPS material degradation therein of the host material 10 illustrated in FIG. 2A.

Figure 4A:
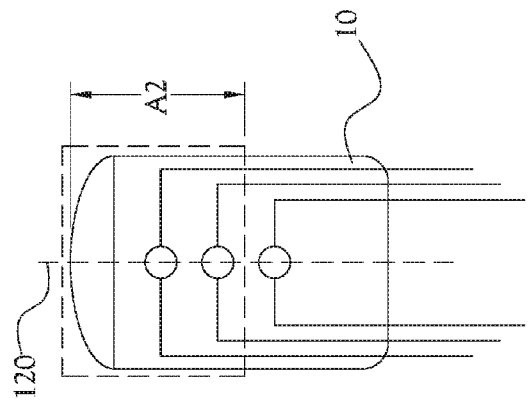
FIG. 4A is a schematic cross-sectional view of a host material having a plurality of balanced-lead thermocouples embedded therein, wherein the host material has degraded to a second position.
Figure 4B:
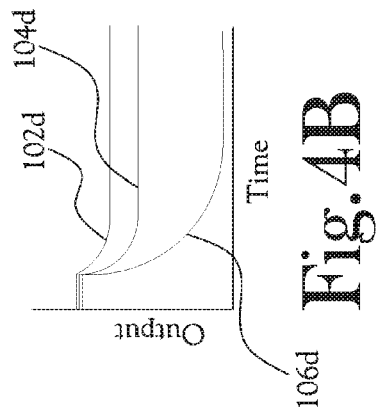
FIG. 4B is a graph illustrating thermocouple response as a function of TPS material degradation therein of the host material illustrated in FIG. 4A.

FIG. 3A is a schematic cross-sectional view of the host material 10 having a plurality of BTCs 100 embedded therein, wherein the host material 10 has degraded to a first position A1. FIG. 3B is a graph illustrating thermocouple response as a function of TPS material degradation therein of the host material illustrated in FIG. 3A. FIG. 4A is a schematic cross-sectional view of the host material 10 having a plurality of balanced-lead thermocouples 100 embedded therein, wherein the host material has degraded to a second position A2. FIG. 4B is a graph illustrating thermocouple response as a function of TPS material degradation therein of the host material illustrated in FIG. 4A.

Referring now to FIG. 3A, the degradation of the host material 10 has developed into a region where the first BTC 102 is embedded. That is, the first position A1 refers to a distance in which the host material 10 has changed and/or degraded. As a result, the thermal response profile 102d of the first BTC 102 changes, thereby alerting the user that the host material 10 has degraded to at least the first BTC 102 at the first depth D1.

Similarly, referring now to FIG. 4A, the degradation of the host material 10 has developed into a region where the first BTC 102 and the second BTC 104 are embedded. That is, the second position A2 refers to a distance in which the host material 10 has changed and/or degraded. As a result, the thermal response profiles 102d and 104d of the first and second BTC 102, 104 changes, thereby alerting the user that the host material 10 has degraded to at least the second BTC 104 at the second depth D2. That is, based on known distances of each BTC 100 within the host material 10, a user can determine the amount (or depth) of degradation of the host material 10, in real-time.

Referring to FIGS. 4B, the user may determine from the monitored response profiles of BTCs 100 that the depth of degradation of the host material 10 is between the depth D2 of the second BTC 104 and the depth D3 of the third BTC 106. In particular, as illustrated in FIG. 4B, the response profiles 102d, 104d of BTCs 102 and 104 have changed, thereby indicating that the host material 10 has changed and/or degraded to at least the second BTC 104 at the second depth D2.

The balanced-lead thermocouple (BTC 100) may be used as a temperature sensor and/or a fluid velocity sensor in various applications and environments. The BTC is specifically modified to be used with the LCSR test method and accounts for inherent shortcomings of this test method.

The instrumentation system monitors material degradation and may be modified to accommodate various other applications. The method according to the present invention incorporates well-known instrumentation technologies and testing methods to yield a robust system that is capable of determining accurate sensor time constants and trending thermal response data over time. The BTC LCSR data obtained by using the system and method according to the present invention yields a response which allows for proper response parameter estimation.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

The invention claimed is:

1. A balanced-lead thermocouple, comprising:
a first lead formed of a first material having a first diameter;
a second lead formed of a second material having a second diameter; and
a sensing element coupled to the first and second leads and formed of a composition including the first material and the second material,
wherein the first and second leads have a temperature ratio of unity when subjected to resistive joule heating based on the first diameter of the first lead and the second diameter of the second lead.

2. An instrumentation system using a balanced-lead thermocouple comprising a first lead formed of a first material having a first diameter, a second lead formed of a second material having a second diameter, a sensing element coupled to the first and second leads and formed of a composition including the first material and the second material, wherein the first and second leads have a temperature ratio of unity when subjected to resistive joule heating based on the first diameter of the first lead and the second diameter of the second lead, the system comprising:
a plurality of balanced-lead thermocouples including a first, second, and third balanced lead thermocouple embedded within a host material along an axis of degradation propagation;
a data acquisition device coupled to the balanced-lead thermocouples to record thermal response data of each balanced lead thermocouple; and
a controller configured to determine a degree of degradation of the host material along the axis based on changes in the thermal response data of one or more of the balanced lead thermocouples over time.

3. The system of claim 2, wherein the controller compares changes in thermal response data between the first and second balanced lead thermocouples to determine a location of degradation of the host material relative to a location of the first and second balanced lead thermocouples within the host material.

4. The system of claim 3, wherein the controller compares changes in thermal response data between the second and third balanced lead thermocouples to determine a location of degradation of the host material relative to a location of the second and third balanced lead thermocouples within the host material.

* * * * *